United States Patent
Condini et al.

(10) Patent No.: US 10,113,680 B2
(45) Date of Patent: Oct. 30, 2018

(54) COVERING SPACER FOR PROTECTING THE INTERNAL SURFACE OF A PIPE JOINING ELEMENT

(71) Applicant: MPR S.R.L., Trento (IT)

(72) Inventors: Alessandro Condini, Trento (IT); Alexey Zhuravlev, Moscow Region (RU)

(73) Assignee: MPR S.R.L., Trento (IT)

( * ) Notice: Subject to any disclaimer, the term of this patent is extended or adjusted under 35 U.S.C. 154(b) by 519 days.

(21) Appl. No.: 14/763,064

(22) PCT Filed: Feb. 26, 2014

(86) PCT No.: PCT/IB2014/000205
§ 371 (c)(1),
(2) Date: Jul. 23, 2015

(87) PCT Pub. No.: WO2014/132116
PCT Pub. Date: Sep. 4, 2014

(65) Prior Publication Data
US 2015/0369417 A1    Dec. 24, 2015

(30) Foreign Application Priority Data
Feb. 28, 2013   (IT) ............................... VI2013A0050

(51) Int. Cl.
F16L 15/08    (2006.01)
F16L 58/18    (2006.01)
(Continued)

(52) U.S. Cl.
CPC ............. *F16L 58/185* (2013.01); *F16L 15/08* (2013.01); *F16L 21/002* (2013.01); *F16L 25/12* (2013.01)

(58) Field of Classification Search
CPC .................................. F16L 15/02; F16L 15/08
(Continued)

(56) References Cited

U.S. PATENT DOCUMENTS 1,370,447 A * 3/1921 Hovis ...................... E21B 17/06
                                                            285/3
1,501,217 A * 7/1924 Heeter .................. F16L 15/001
                                                            285/3
(Continued)

OTHER PUBLICATIONS

International Search Report and Written Opinion dated Jun. 10, 2014, issued in PCT Application No. PCT/IB2014/000205, filed Feb. 26, 2014.

*Primary Examiner* — David Bochna
(74) *Attorney, Agent, or Firm* — Workman Nydegger

(57) ABSTRACT

A covering spacer interposed between two facing ends of two pipes connected to each other through a joining element includes: a first annular element with its external surface with constant diameter and a second annular element with its internal surface with constant diameter. The external surface of the second annular element and the internal surface of the first annular element are configured so as to allow them to be coupled with each other through interference. Yielding connection points are suited to maintain the first and the second annular element joined together at the level of their two first ends. The yielding connection points are configured so that they break when the first annular element and the second annular element are thrust against each other through the application of a predefined minimum pressure.

24 Claims, 5 Drawing Sheets

(51) Int. Cl.
*F16L 21/00* (2006.01)
*F16L 25/12* (2006.01)

(58) Field of Classification Search
USPC ............ 285/3, 55, 333, 334; 138/96 T, 96 R
See application file for complete search history.

(56) References Cited

U.S. PATENT DOCUMENTS

| | | | |
|---|---|---|---|
| 2,233,734 A | | 3/1941 | Ely et al. |
| 2,813,568 A | * | 11/1957 | Kilmarx, Jr. ............ B60C 29/02 |
| | | | 285/3 |
| 3,340,762 A | * | 9/1967 | Bennett ............... F16B 19/1081 |
| | | | 285/3 |
| 3,470,893 A | * | 10/1969 | Nelson ................... B60K 25/04 |
| | | | 285/3 |
| 3,479,059 A | * | 11/1969 | Taylor .................... F16L 15/08 |
| | | | 285/55 |
| 3,596,931 A | * | 8/1971 | Mishler ................ F16L 15/003 |
| | | | 285/55 |
| 3,605,251 A | * | 9/1971 | Salerno et al. ........ B65H 57/06 |
| | | | 285/3 |
| 3,605,947 A | * | 9/1971 | Salerno et al. .......... H02G 1/08 |
| | | | 285/3 |
| 3,677,575 A | * | 7/1972 | Wedel ..................... F16L 55/10 |
| | | | 285/3 |
| 5,348,211 A | * | 9/1994 | White ................... F16L 58/181 |
| | | | 285/55 |
| 5,911,443 A | * | 6/1999 | Le Quere ............ F16L 37/0915 |
| | | | 285/3 |
| 7,032,933 B2 | * | 4/2006 | Hellman ................ F16L 15/003 |
| | | | 285/3 |
| 7,090,257 B2 | * | 8/2006 | Werth ................... F16L 33/225 |
| | | | 285/3 |
| 7,922,212 B2 | * | 4/2011 | Werth ................... A61M 39/12 |
| | | | 285/3 |
| 7,922,213 B2 | * | 4/2011 | Werth ................ F16L 33/2071 |
| | | | 285/3 |
| 2009/0008929 A1 | | 1/2009 | Person |
| 2014/0300098 A1 | * | 10/2014 | Zhuravlev ............ F16L 15/001 |
| | | | 285/55 |

* cited by examiner

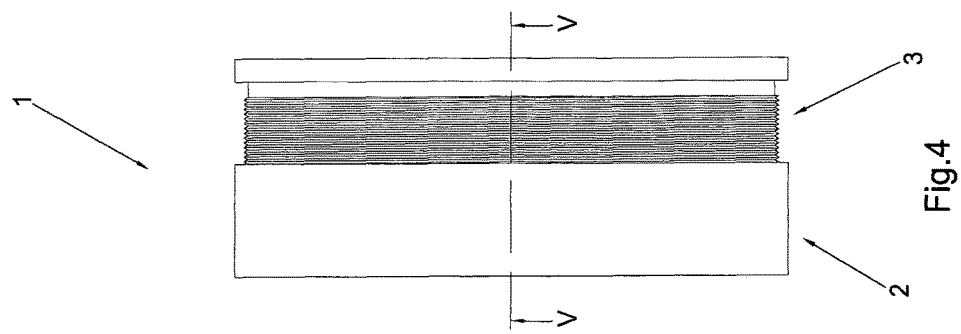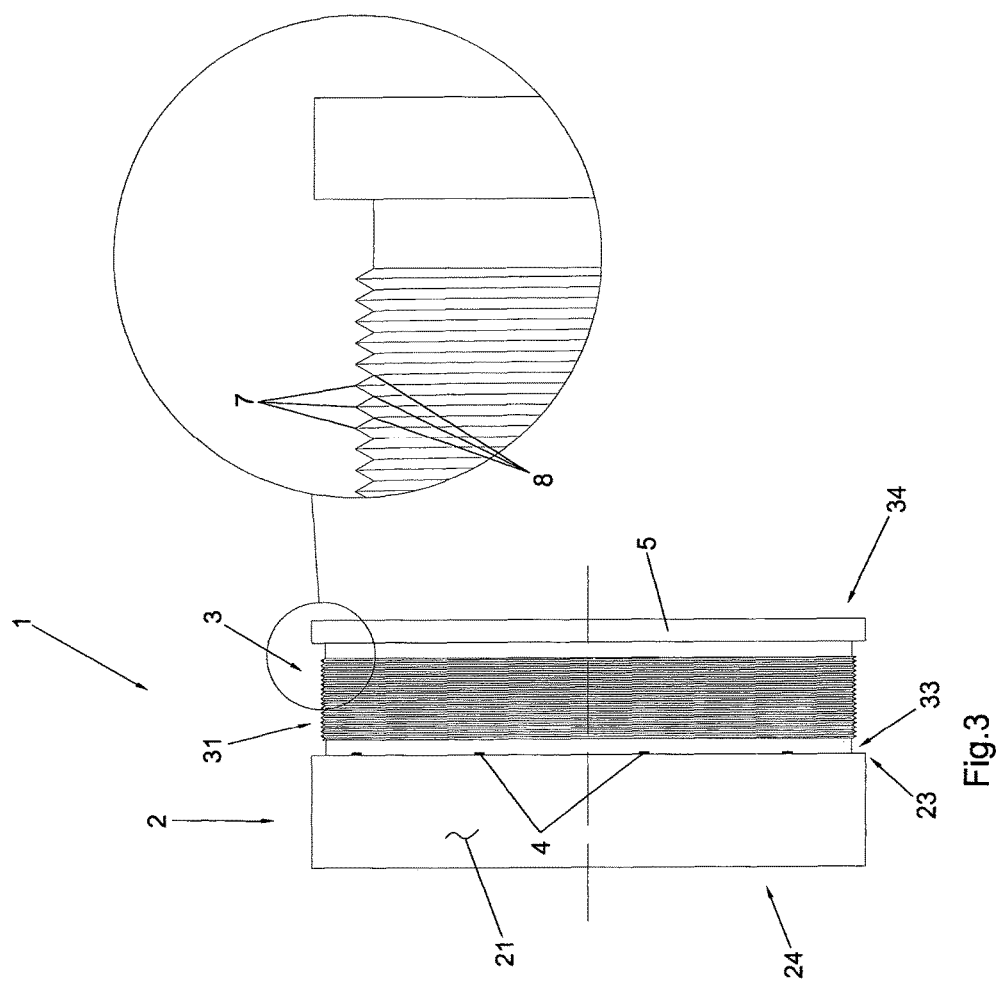

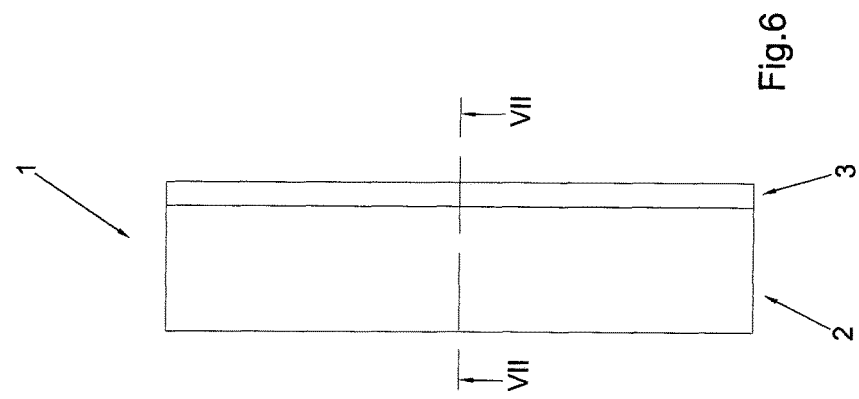
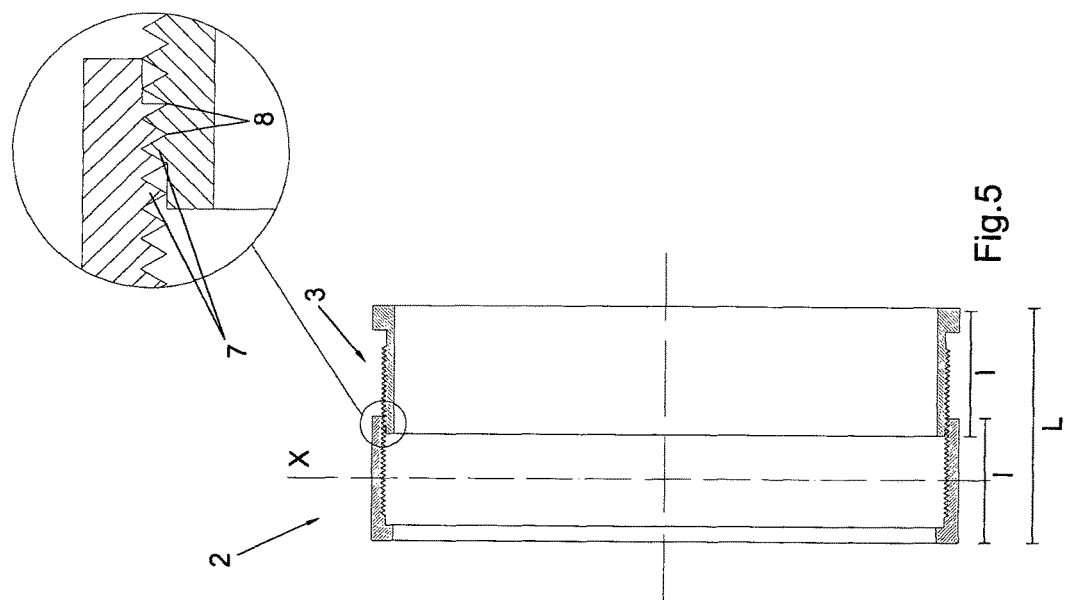

COVERING SPACER FOR PROTECTING THE INTERNAL SURFACE OF A PIPE JOINING ELEMENT

BACKGROUND OF THE INVENTION

1. Field of the Invention

The invention concerns a covering spacer suited to protect the internal surface of a joining element, preferably a sleeve, used to connect the facing ends of two pipes.

2. Present State of the Art

It is known that the systems used to extract or process fluid raw materials, such as oil or gas, and the networks used for the distribution of fluid substances, such as water or gas, comprise special piping systems that are more or less complex and extended. These piping systems obviously make it possible to connect the various pieces of equipment of said systems or to connect the same systems to the final users.

For obvious reasons, said piping systems cannot be made in a single piece but comprise several pipes connected to each other in pairs at the level of their facing ends, in such a way as to cover the section having a predefined length. In particular, the coupling of said pipes is carried out with special joining elements, among which the so-called "sleeves" are known. Said sleeves comprise a tubular portion whose inner diameter substantially coincides with the outer diameter of the ends of the pipes to be connected.

Usually, both the internal surface of the sleeve and the external surfaces of the pipes, at the level of their ends to be connected, are provided with suitable threads and counter threads, so as to allow said ends to be screwed on the opposite sides of the sleeve.

However, this type of joint disadvantageously poses some recognized drawbacks that are described here below.

A first drawback is caused by the fact that said pipes, in most cases, are not coupled with the sleeve with their facing ends completely in contact with each other.

On the contrary, said pipes are generally spaced from each other.

A joining section is thus defined, hereinafter referred to with the term "gap", whose diameter, equivalent to the inner diameter of the sleeve, is larger than the inner diameter of said two facing pipes.

To disadvantage, the presence of said gap causes the deviation of the normal flow of the fluid substance transported inside the pipes, consequently generating turbulence phenomena in proximity to the shoulders defined by said differences in diameter. Said turbulence phenomena, in turn, cause an increase in the fluid dynamic resistance of the same fluid substance, thus slowing down its flow inside the pipes.

Furthermore, the direct contact of the fluid substance with the connection points between sleeve and pipes determines, in the case where said fluid substance is a corrosive substance, the corrosion of the same connection points, with the consequent deterioration of the mechanical resistance of the joint.

Said corrosive effect is further increased by the generation of said turbulence phenomena in proximity to the connection points.

It is known that in order to avoid said corrosion anti-oxidant and lubricating compounds are used that are applied to protect the internal surface of the sleeve. However, to disadvantage, the fluid substance that flows inside the is pipes little by little tends to wear away or remove said anti-oxidant and lubricating compounds from the internal surface of the sleeve, thus exposing the same to possible corrosive actions.

The attempt to use covering spacers in order to fill said gap is also known. However, many of the covering spacers of the known art include the use of O rings. Therefore there is the need, to disadvantage, to periodically perform maintenance operations intended to replace said O rings once they have worn out.

A further drawback posed by the covering spacers of the known art consists in the fact that they cannot compensate for the variations in the width of said joining section.

Said variation can be due both to the will and need of the system manager to readjust the pipe joint and to the deterioration of the mechanical resistance between the same pipes and the sleeve.

The inability of the spacers of the known art to adapt to said variation, notwithstanding their presence, causes the occurrence of said drawbacks.

In other words, once the width of said joining section between the ends of the two pipes has been defined in advance, said width cannot be changed, otherwise said drawbacks will arise.

SUMMARY OF THE INVENTION

The present invention intends to overcome the said drawbacks.

In particular, the object of the invention is to provide a covering spacer that is capable of filling completely and in a continuous way the gap that is defined between the two facing ends of the coupled pipes, through a joining element. Consequently, it is the object of the invention to avoid the generation of said turbulence phenomena in the points where the two pipes are joined and to avoid the corresponding increase in fluid dynamic resistance.

Furthermore, it is the object of the invention to provide a covering spacer that effectively avoids any contact of the potentially corrosive fluid substances with the connection points between the pipes and the joining element or with the anti-oxidant and lubricating compounds, in such a way as to prevent their to corrosion.

It is a further object of the invention to provide a covering spacer that is capable of avoiding the formation of a gap between the ends of the coupled pipes, even in the case where their distance is changed.

Again, it is the object of the present invention to provide a covering spacer that is capable of filling said gap, even during the coupling of said pipes.

A further object of the invention is to provide a covering spacer that is easier and quicker to install compared to the covering spacers of the known art. Furthermore, it is the object of the invention to provide a covering spacer that avoids the need to establish in advance the coupling distance between the two pipes to be connected.

It is another, yet not the least object of the invention to provide a covering spacer that considerably limits the need for maintenance operations compared to the covering spacers of the known type.

The objects mentioned above are achieved by the covering spacer having the characteristics described in the main claim.

Further characteristics of the covering spacer that is the subject of the invention are described in the dependent claims.

BRIEF DESCRIPTION OF THE DRAWINGS

The said objects, together with the advantages that are described below, are highlighted in the description of a preferred embodiment of the invention that is provided by way of non-limiting example with reference to the attached drawings, wherein:

FIG. 3 shows a side view of the covering spacer of the invention;

FIG. 4 shows a side view of the covering spacer of the invention in the first limit coupling position between the two annular elements;

FIG. 5 shows the sectional view of the covering spacer of the invention according to section plane V-V of FIG. 4;

FIG. 6 shows a side view of the covering spacer of the invention in the second limit coupling position between the two annular elements;

DETAILED DESCRIPTION OF THE PREFERRED EMBODIMENTS

The covering spacer that is the subject of the invention is represented as a whole in Figures from 1 to 3, where it is indicated as a whole by 1.

Figure 8:
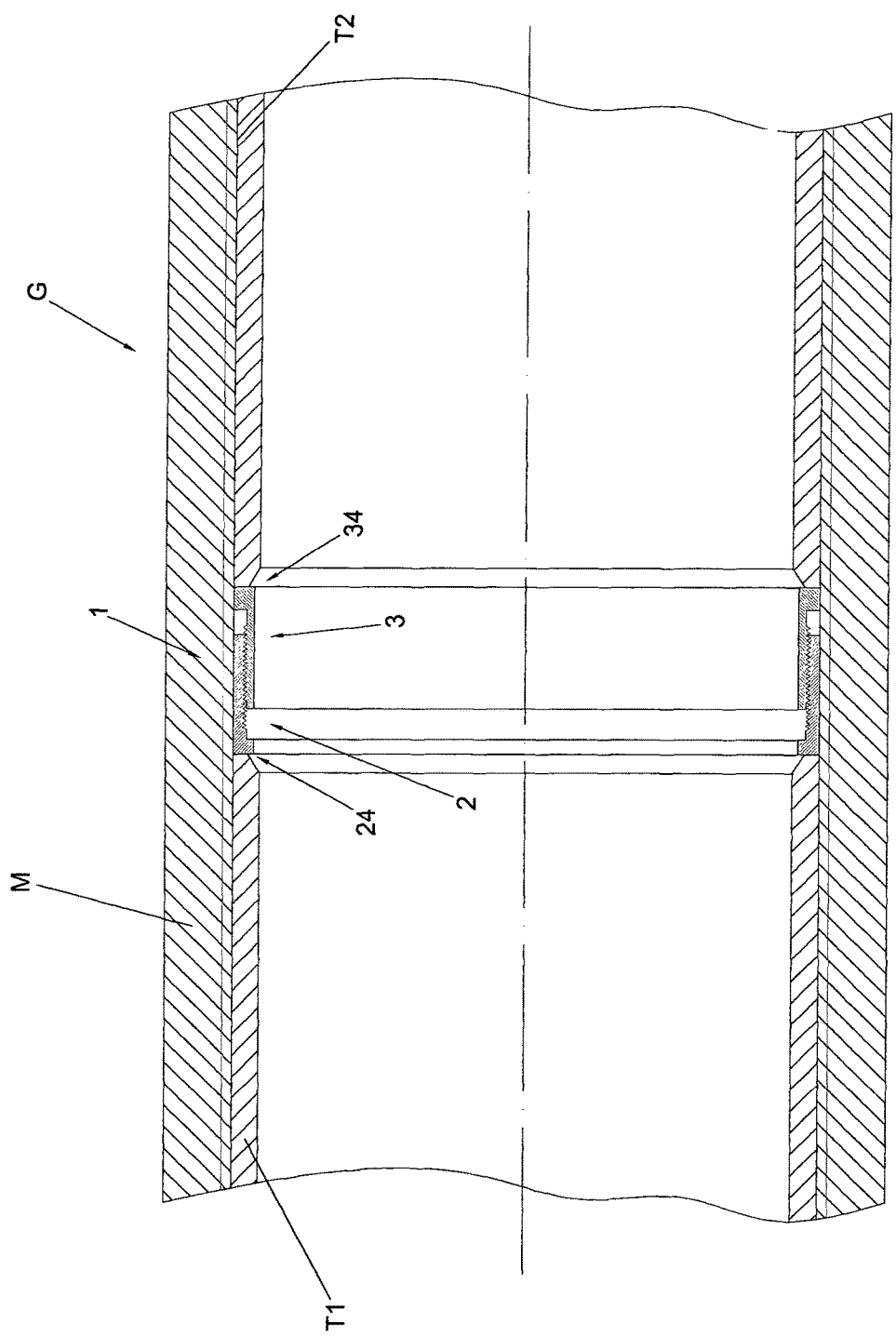
FIG. 8 shows the sectional view of the covering spacer of the invention inserted in a section joining two pipes through a sleeve.

Said covering spacer 1 is suited to be interposed between the facing ends of two pipes T1 and T2, connected to each other through a joining element G, in particular through a sleeve M, as shown in FIG. 8.

According to the invention, as shown in Figures from 1 to 3, the covering spacer 1 comprises a first annular element 2, having its internal surface 21 with constant diameter, and a second annular element 3, in turn having its internal surface 32 with constant diameter.

Concerning the external surface 31 of the second annular element 3 and the internal surface 22 of the first annular element 2, these are configured so as to allow their mutual coupling through interference and thus the coupling through interference between the same annular elements 2 and 3.

Figure 2:
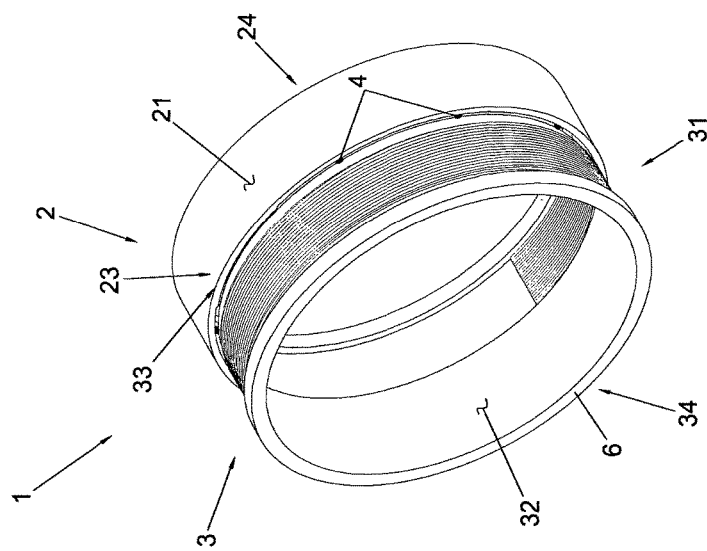
FIG. 2 shows a second axonometric view of the covering spacer of the invention.

The spacer 1 of the invention, furthermore; comprises yielding connection points 4 suited to maintain said first and said second annular elements 2 and 3 joined together at the level of their two first ends 23 and 33, in a static configuration, as can be observed in FIGS. 2 and 3.

Said yielding connection points 4 are configured so that they break up at the moment when the first annular element and the second annular element 2 and 3 are pushed against each other through the application of a pre-established minimum pressure.

Therefore, the breakage of the yielding connection points 4 allows the covering spacer 1 to pass from said static configuration, in which the first annular element and the second annular element 2 and 3 are fixedly connected to each other, to a mobile configuration, in which the second annular element 3 is able to be housed in the first annular element 2 by means of a coupling through interference.

In particular, said last mobile configuration makes it possible to vary the mutual coupling position of the two annular elements 2 and 3, consequently modifying the overall width L of the covering spacer 1 of the invention.

FIGS. 4 and 5 and FIGS. 6 and 7 respectively show the two limit positions that the two annular elements 2 and 3 can mutually assume with respect to each other, wherein said annular elements 2 and 3, according to the preferred embodiment represented herein, have the same width L.

Figure 7:
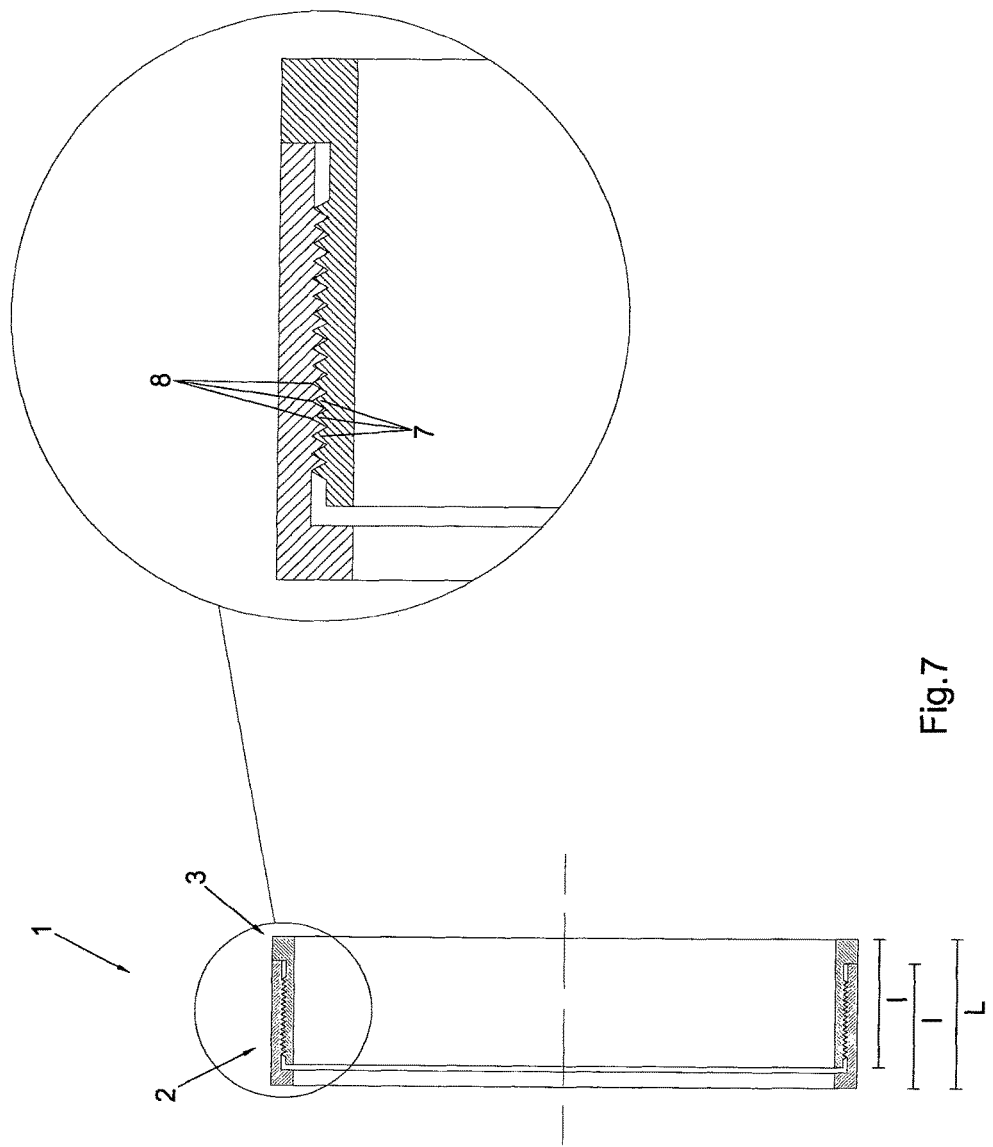
FIG. 7 shows the sectional view of the covering spacer of the invention according to section plane VII-VII of FIG. 6.

As can be observed in detail in FIGS. 6 and 7, the two annular elements 2 and 3 can assume a first terminal position in which they are completely superimposed on each other. Consequently, the width L of the spacer 1 of the invention is substantially equal to the width l of a single annular element 2 or 3.

FIGS. 4 and 5 show, instead, the second limit position concerning the coupling of the two annular elements 2 and 3, in which they overlap each other for a minimum length, sufficient to guarantee their coupling through interference.

In this case the spacer 1 has a width L that is slightly smaller than the sum of the widths l of the two annular elements 2 and 3.

Said two positions are reversible with respect to each other and the two annular elements 2 and 3 can be coupled with each other in any intermediate position between said two limit positions.

Since the coupling of the two annular elements 2 and 3 is a coupling through interference, in order to vary the mutual position between the same annular elements it is necessary to apply to them a force that must be sufficient to counteract the static friction force present between the internal surface 22 of the first annular element 2 and the external surface 31 of the second annular element 3.

Otherwise, the two annular elements 2 and 3 maintain the mutual position they have assumed.

The advantages of said characteristic are highlighted below, in the description of the operative use of the spacer 1 of the invention to connect the two pipes T1 and T2 through the joining element G.

Figure 1:
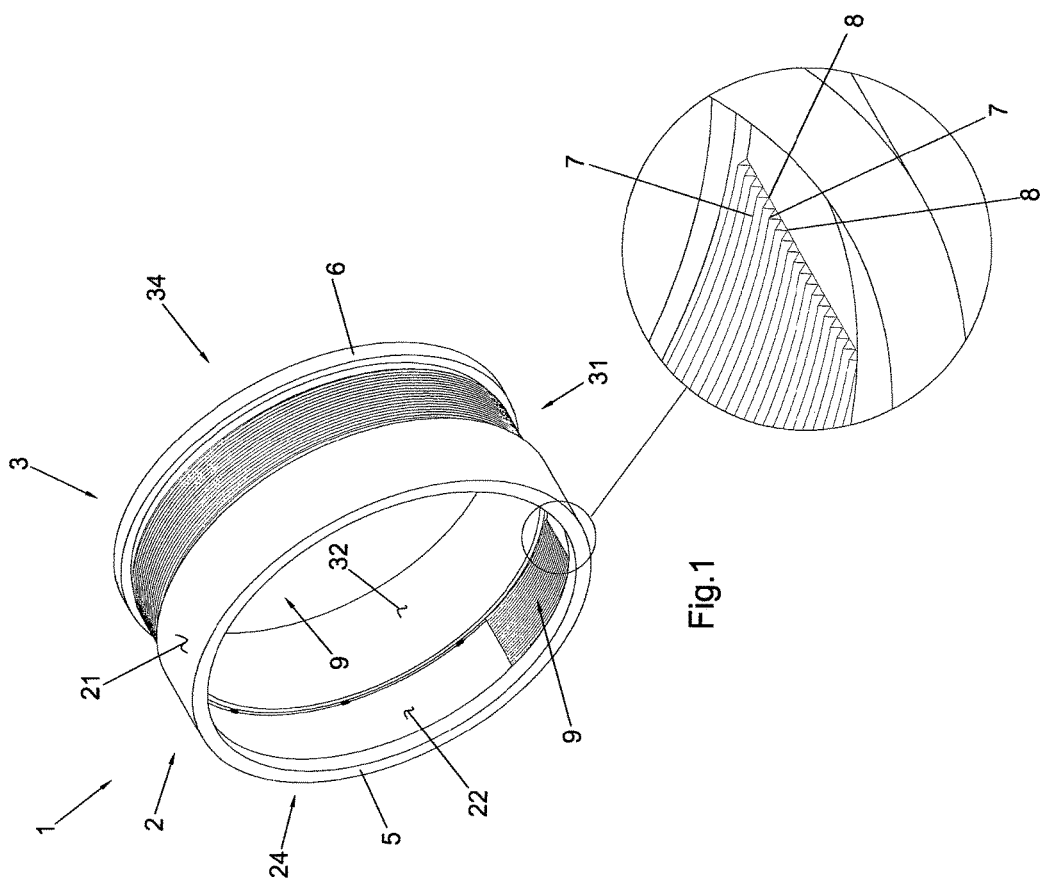
FIG. 1 shows a first axonometric view of the covering spacer that is the subject of the invention.

According to the preferred embodiment of the spacer 1 of the invention, as shown in FIGS. 1 and 2, the first annular element 2 has, at the level of its second end 24 opposite the first end 23, a first shoulder 5 whose diameter is smaller than the diameter of its internal surface 22.

Since said second end 24 is suited to be placed in contact with the end of a first one of the two pipes to be connected, for example pipe T1, advantageously the presence of said shoulder 5 makes it possible to improve the contact between the first annular element 2 and the pipe T1 itself.

In turn, preferably but not necessarily, the second annular element 3 has, at the level of its second end 34 opposite the first end 33, a second shoulder 6 whose diameter is larger than the diameter of the external surface 31 of said second annular element 3.

Also in this case, as the second end 34 is suited to be placed in contact with the end of the second one of the two pipes to be connected, for example pipe T2, the presence of said second shoulder 6 advantageously makes it possible to improve the contact between the second annular element 3 and said second pipe T2.

It cannot be excluded, however, that in different embodiments of the spacer 1 of the invention said shoulders 5 and 6 are not provided or that just one of them is present.

According to the preferred embodiment of the spacer 1 of the invention, the first annular element 2 and the second annular element 3 are respectively provided, on their internal surface 22 and on their external surface 31, with depressions 7 alternating with projections 8, as shown in FIGS. 1 and 5, in such a way as to favour their coupling through interference.

In particular, according to the preferred embodiment of the invention said depressions 7 and said projections 8 are provided on the internal surface 22 of the first annular element 2 exclusively at the level of two distinct sectors 9, as shown in FIG. 1.

Concerning, instead, the second annular element 3, said depressions 7 and projections 8 are provided along the entire external surface 31.

The fact that the depressions 7 and the projections 8 are made on the internal surface 22 exclusively at the level of said two sectors 9 allows the second annular element 3, when its projections 8 counteract those present on the first annular element 2, to become oval along the direction substantially orthogonal to the straight line X joining said two sectors 9 and represented in FIG. 5, facilitating its introduction and the connection with said first element 2. Alternatively, it cannot be excluded that, according to a different embodiment of the spacer 1 of the invention, said distinct sectors 9, where there are the depressions 7 and the projections 8, are defined on the external surface 31 of the second annular element 3, while with regard to the first annular element 2 said depressions 7 and projections 8 are provided along the entire internal surface 22.

Going back to the preferred embodiment of the invention, said depressions 7 to and projections 8, for both the first and the second annular element 2 and 3, are projections and depressions made according to a spiral-shaped pattern. This characteristic, to advantage, in addition to guaranteeing the coupling through interference between the two annular elements 2 and 3, makes it possible to connect and release the same annular elements by screwing and unscrewing them.

It cannot be excluded, however, that in a further alternative embodiment of the spacer 1 of the invention, both the external surface 31 of the second annular element 3 and the internal surface 22 of the first annular element 2 are substantially smooth surfaces, provided that they are configured in such a way as to allow the coupling through interference between said two annular elements 2 and 3.

Concerning the yielding connection points 4, each one of them is spaced from the points adjacent to it along the circumference defined by the two first ends 23 and 33.

Alternatively, said yielding connection points 4 can be carried out in a continuous way along the entire circumference defined by said two first ends 23 and 33.

The two annular elements 2 and 3 are preferably but not necessarily made of a thermoplastic material resistant to high temperatures (from −40° to +200° C.) and to corrosion, so that they can resist different operating conditions as well as allowing the use of different types of fluid substances flowing inside the pipes.

In particular, the thermoplastic material used is nylon reinforced with fiberglass. The two annular elements 2 and 3 are preferably but not necessarily made through injection moulding.

Operatively, as already mentioned, the covering spacer 1 of the invention is arranged between two facing ends of the two pipes T1 and T2 connected through the joining element G, in particular the sleeve M, as shown in FIG. 8. Said spacer 1 has the function to completely fill the gap that forms when the two ends of the pipes T1 and T2 to be connected are coupled with the sleeve M, at a certain distance from each other. Filling said gap prevents the corrosive substances that are transported in the pipes from coming directly into contact with the connection points between the same pipes and the sleeve M and, at the same time, avoids the generation of turbulence phenomena in said to substances at those connection points.

In greater detail, the connection between the two pipes T1 and T2 through the sleeve M and the use of the covering spacer 1 of the invention include a first step in which the end of one of the pipes, for example T1, is coupled with one side of the sleeve M, usually by screwing.

Successively, the covering spacer 1 of the invention is inserted in the other side of the sleeve M, so that one of the second ends of one of the two annular elements 2 or 3, for example the second end 24 of the annular element 2, rests on the end of said pipe T1.

The fact that the two annular elements 2 and 3 are connected with each other in a stable manner through said yielding connection points 4 advantageously makes it possible to facilitate and quicken the insertion of the spacer 1 of the invention into the sleeve M and to successively obtain their precise coupling. In the successive step, the second one of the two pipes, pipe T2, is coupled with the sleeve M, preferably by screwing, on the same side where the covering spacer 1 of the invention has been inserted.

During this coupling operation, the end of the second pipe T2 comes progressively into contact with the other second end 34 of the spacer 1. Once obtained said contact, advantageously, the gap between the two ends of the pipes T1 and T2 is completely filled.

However, in order to obtain a more stable and safer coupling between the two pipes T1 and T2, the second pipe T2 is moved nearer the first pipe T1 continuing the screwing action. Said thrust causes the breakage of the yielding connection points 4 of the spacer 1 of the invention and causes the progressive movement of the second annular element 3 towards the first annular element 2 as well as the coupling through interference of said two annular elements, until the second pipe T2 is advanced inside the sleeve M. According to above, the use of the spacer 1 of the invention advantageously makes it possible to fill the entire gap between the two pipes T1 and T2 while the pipes are being connected and with no need to define in advance the actual width of said gap.

Therefore, according to the above, the covering spacer that is the subject of the invention achieves all the set objects.

In particular, the invention achieves the object to provide a covering spacer capable of filling completely and in a continuous way the gap that forms between the two facing ends of the pipes coupled with each other through a joining element.

Consequently, the invention achieves the object to avoid the generation of said turbulence phenomena at the connection points of two pipes and to avoid the relative increase in fluid dynamic resistance.

Furthermore, the invention also achieves the object to provide a covering spacer that effectively avoids the contact of potentially corrosive fluid substances with the connection points between the pipes and the joining element or with the anti-oxidant and lubricating compounds applied to said points in order to prevent them from being corroded.

The invention furthermore achieves the object to provide a covering spacer that is capable of avoiding the formation of a gap between the ends of the coupled pipes, even in the case where the distance between said pipes is changed.

The invention also achieves the object to provide a covering spacer that is capable of filling said gap, even during the coupling of said pipes.

The invention achieves the further object to provide a covering spacer that is easier and quicker to install compared to the covering spacers of the known art.

The invention furthermore achieves the object to provide a covering spacer that avoids the need to establish in advance the coupling distance between the two pipes to be coupled with the aid of the joining element.

Finally, the invention achieves the object to provide a covering spacer that considerably limits the need for maintenance operations compared to the known covering spacers.

The invention claimed is:

1. A covering spacer suited to be interposed between two facing ends of two pipes connected to each other through a joining element, comprising:
- a first annular element having a first end, an opposing second end, and an external surface with a constant diameter extending therebetween;
- a second annular element having a first end, an opposing second end, and an internal surface with a constant diameter extending therebetween; and
- yielding connection points connecting the first end of said first annular element to the first end of said second annular element so that the second end of the first annular element and second end of the second annular element are disposed on opposing sides of the connection between the first ends of the first and second annular elements,
- wherein the first and second annular elements are configured so that when the first end of the first annular element is pushed toward the second end of said second annular element with a pre-established minimum pressure, the yielding connection points break and the first end of the first annular element moves toward the second end of the second annular element so as to produce an interference coupling between the internal surface of the first annular element and the external surface of the second annular element;
- wherein, at the level of its second end opposite said first end, said first annular element is provided with a first shoulder whose diameter is smaller than the diameter of said internal surface, said first shoulder being suited to be placed in contact with the end of a first one of said pipes.

2. The spacer according to claim 1, wherein, at the level of its second end opposite said first end, said second annular element is provided with a second shoulder whose diameter is larger than the diameter of said external surface, said second shoulder being suited to be placed in contact with the end of the second one of said pipes.

3. The spacer according to claim 1, wherein on said internal surface of said first annular element and on said external surface of said second annular element there are depressions alternating with projections in order to allow said coupling through the interference coupling between said first and said second annular element.

4. The spacer according to claim 3, wherein said depressions and said projections are provided at the level of at least two distinct sectors of said internal surface of said first annular element.

5. The spacer according to claim 3, wherein said depressions and said projections are provided at the level of at least two distinct sectors of said external surface of said second annular element.

6. The spacer according to claim 3, wherein said depressions and said projections are provided on the entire external surface of said second annular element and on the entire internal surface of said first annular element.

7. The spacer according to claim 3, wherein said depressions and said projections are projections and depressions created according to a spiral-shaped pattern.

8. The spacer according to claim 1, wherein said external surface of said first annular element and said internal surface of said second annular element are substantially smooth surfaces.

9. The spacer according to claim 1, wherein said yielding connection points are created in a continuous way along the entire circumference of said first ends.

10. The spacer according to claim 1, wherein it is made of a thermoplastic material resistant to high temperatures and corrosion.

11. The spacer according to claim 10, wherein said thermoplastic material is nylon reinforced with fiberglass.

12. A covering spacer suited to be interposed between two facing ends of two pipes connected to each other through a joining element, comprising:
- a first annular element having a first end, an opposing second end, and an external surface with a constant diameter extending therebetween;
- a second annular element having a first end, an opposing second end, and an internal surface with a constant diameter extending therebetween; and
- a continuous yielding connection connecting the first end of said first annular element to the first end of said second annular element so that the second end of the first annular element and second end of the second annular element are disposed on opposing sides of the connection between the first ends of the first and second annular elements,
- wherein the first and second annular elements are configured so that when the first end of the first annular element is pushed toward the second end of said second annular element with a pre-established minimum pressure, the yielding connection points break and the first end of the first annular element moves toward the second end of the second annular element so as to produce an interference coupling between the internal surface of the first annular element and the external surface of the second annular element;
- wherein, at the level of its second end opposite said first end, said first annular element is provided with a first shoulder whose diameter is smaller than the diameter of said internal surface, said first shoulder being suited to be placed in contact with the end of a first one of said pipes.

13. The spacer according to claim 12, wherein, at the level of its second end opposite said first end, said second annular element is provided with a second shoulder whose diameter is larger than the diameter of said external surface, said second shoulder being suited to be placed in contact with the end of the second one of said pipes.

14. The spacer according to claim 12, wherein on said internal surface of said first annular element and on said external surface of said second annular element there are depressions alternating with projections in order to allow said coupling through the interference coupling between said first and said second annular element.

15. The spacer according to claim 14, wherein said depressions and said projections are provided at the level of at least two distinct sectors of said internal surface of said first annular element.

16. The spacer according to claim 14, wherein said depressions and said projections are provided at the level of at least two distinct sectors of said external surface of said second annular element.

17. The spacer according to claim 14, wherein said depressions and said projections are provided on the entire external surface of said second annular element and on the entire internal surface of said first annular element.

18. The spacer according to claim 14, wherein said depressions and said projections are projections and depressions created according to a spiral-shaped pattern.

19. The spacer according to claim 12, wherein said external surface of said first annular element and said internal surface of said second annular element are substantially smooth surfaces.

20. The spacer according to claim 12, wherein said yielding connection points are created in a continuous way along the entire circumference of said first ends.

21. The spacer according to claim 12, wherein it is made of a thermoplastic material resistant to high temperatures and corrosion.

22. The spacer according to claim 12, wherein said thermoplastic material is nylon reinforced with fiberglass.

23. A covering spacer suited to be interposed between two facing ends of two pipes connected to each other through a joining element, comprising:
   a first annular element having a first end, an opposing second end, and an external surface with a constant diameter extending therebetween;
   a second annular element having a first end, an opposing second end, and an internal surface with a constant diameter extending therebetween; and
   yielding connection points connecting the first end of said first annular element to the first end of said second annular element so that the second end of the first annular element and second end of the second annular element are disposed on opposing sides of the connection between the first ends of the first and second annular elements,
   wherein the first and second annular elements are configured so that when the first end of the first annular element is pushed toward the second end of said second annular element with a pre-established minimum pressure, the yielding connection points break and the first end of the first annular element moves toward the second end of the second annular element so as to produce an interference coupling between the internal surface of the first annular element and the external surface of the second annular element,
   wherein on the internal surface of the first annular element and on the external surface of the second annular element there are depressions alternating with projections in order to allow the interference coupling between the first and the second annular element to be obtained, and
   wherein the depressions and the projections are projections and depressions created according to a spiral-shaped pattern.

24. A covering spacer suited to be interposed between two facing ends of two pipes connected to each other through a joining element, comprising:
   a first annular element having a first end, an opposing second end, and an external surface with a constant diameter extending therebetween;
   a second annular element having a first end, an opposing second end, and an internal surface with a constant diameter extending therebetween; and
   a continuous yielding connection connecting the first end of said first annular element to the first end of said second annular element so that the second end of the first annular element and second end of the second annular element are disposed on opposing sides of the connection between the first ends of the first and second annular elements,
   wherein the first and second annular elements are configured so that when the first end of the first annular element is pushed toward the second end of said second annular element with a pre-established minimum pressure, the yielding connection points break and the first end of the first annular element moves toward the second end of the second annular element so as to produce an interference coupling between the internal surface of the first annular element and the external surface of the second annular element,
   wherein on the internal surface of the first annular element and on the external surface of the second annular element there are depressions alternating with projections in order to allow the interference coupling between the first and the second annular element, and
   wherein the depressions and the projections are projections and depressions created according to a spiral-shaped pattern.

* * * * *